(12) United States Patent
Grawrock

(10) Patent No.: US 7,318,235 B2
(45) Date of Patent: Jan. 8, 2008

(54) ATTESTATION USING BOTH FIXED TOKEN AND PORTABLE TOKEN

(75) Inventor: David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 743 days.

(21) Appl. No.: 10/321,751

(22) Filed: Dec. 16, 2002

(65) Prior Publication Data

US 2004/0117625 A1 Jun. 17, 2004

(51) Int. Cl.
*G06F 12/00* (2006.01)
*G06F 12/14* (2006.01)
*G06F 13/00* (2006.01)
*G06F 17/30* (2006.01)
*G06F 7/04* (2006.01)
*G06K 19/00* (2006.01)
*H04L 9/00* (2006.01)
*H04K 1/00* (2006.01)
*G06F 11/00* (2006.01)
*G06F 12/16* (2006.01)

(52) U.S. Cl. .......................... 726/26; 726/20; 713/159; 713/185; 713/172; 713/193; 380/278; 380/283; 380/284; 380/285; 705/54; 705/55; 705/65

(58) Field of Classification Search ................ 713/159, 713/172, 185, 193, 194; 726/9, 20, 26; 380/283–285, 380/278; 705/54–55, 65–67
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,366,537 A | 12/1982 | Heller et al. | |

(Continued)

FOREIGN PATENT DOCUMENTS

DE 4217444 12/1992

(Continued)

OTHER PUBLICATIONS

Intel. "Intel Protected Access Architecture, Application Interface Specification Revision 0.9.5", Aug. 2000.*

(Continued)

*Primary Examiner*—Gilberto Barron
*Assistant Examiner*—Michael J. Simitoski
(74) *Attorney, Agent, or Firm*—Blakely, Sokoloff, Taylor & Zafman LLP

(57) ABSTRACT

Methods, apparatus and machine readable medium are described for creating and using protected key blobs that require a particular portable token be present before use of the key or keys of the protected key blob is granted. Such protected key blobs may be used to establish a level of trust between a local user and the computing device.

22 Claims, 6 Drawing Sheets

U.S. PATENT DOCUMENTS

| | | | |
|---|---|---|---|
| 4,403,283 | A | 9/1983 | Myntti et al. |
| 4,419,724 | A | 12/1983 | Branigin et al. |
| 4,430,709 | A | 2/1984 | Schleupen et al. |
| 4,521,852 | A | 6/1985 | Guttag |
| 4,529,870 | A | 7/1985 | Chaum |
| 4,571,672 | A | 2/1986 | Hatada et al. |
| 4,621,318 | A | 11/1986 | Maeda |
| 4,759,064 | A | 7/1988 | Chaum |
| 4,795,893 | A | 1/1989 | Ugon |
| 4,802,084 | A | 1/1989 | Ikegaya et al. |
| 4,843,541 | A | 6/1989 | Bean et al. |
| 4,974,159 | A | 11/1990 | Hargrove et al. |
| 4,975,836 | A | 12/1990 | Hirosawa et al. |
| 5,007,082 | A | 4/1991 | Cummins |
| 5,022,077 | A | 6/1991 | Bealkowski et al. |
| 5,075,842 | A | 12/1991 | Lai |
| 5,079,737 | A | 1/1992 | Hackbarth |
| 5,187,802 | A | 2/1993 | Inoue et al. |
| 5,230,069 | A | 7/1993 | Brelsford et al. |
| 5,237,616 | A | 8/1993 | Abraham et al. |
| 5,255,379 | A | 10/1993 | Melo |
| 5,287,363 | A | 2/1994 | Wolf et al. |
| 5,293,424 | A | 3/1994 | Hotley et al. |
| 5,295,251 | A | 3/1994 | Wakui et al. |
| 5,317,705 | A | 5/1994 | Gannon et al. |
| 5,319,760 | A | 6/1994 | Mason et al. |
| 5,361,375 | A | 11/1994 | Ogi |
| 5,386,552 | A | 1/1995 | Garney |
| 5,421,006 | A | 5/1995 | Jablon et al. |
| 5,455,909 | A | 10/1995 | Blomgren et al. |
| 5,459,867 | A | 10/1995 | Adams et al. |
| 5,459,869 | A | 10/1995 | Spilo |
| 5,469,557 | A | 11/1995 | Salt et al. |
| 5,473,692 | A | 12/1995 | Davis |
| 5,479,509 | A | 12/1995 | Ugon |
| 5,504,922 | A | 4/1996 | Seki et al. |
| 5,506,975 | A | 4/1996 | Onodera |
| 5,555,385 | A | 9/1996 | Osisek |
| 5,555,414 | A | 9/1996 | Hough et al. |
| 5,560,013 | A | 9/1996 | Scalzi et al. |
| 5,564,040 | A | 10/1996 | Kubals |
| 5,568,552 | A | 10/1996 | Davis |
| 5,574,936 | A | 11/1996 | Ryba et al. |
| 5,582,717 | A | 12/1996 | Di Santo |
| 5,604,805 | A | 2/1997 | Brands |
| 5,606,617 | A | 2/1997 | Brands |
| 5,615,263 | A | 3/1997 | Takahashi |
| 5,628,022 | A | 5/1997 | Ueno et al. |
| 5,628,023 | A | 5/1997 | Bryant et al. |
| 5,633,929 | A | 5/1997 | Kaliski, Jr. |
| 5,657,445 | A | 8/1997 | Pearce |
| 5,668,971 | A | 9/1997 | Neufeld |
| 5,680,547 | A | 10/1997 | Chang et al. |
| 5,684,948 | A | 11/1997 | Johnson et al. |
| 5,706,469 | A | 1/1998 | Kobayashi |
| 5,717,903 | A | 2/1998 | Bonola |
| 5,727,061 | A * | 3/1998 | Johnson et al. ............. 713/165 |
| 5,729,760 | A | 3/1998 | Poisner |
| 5,737,760 | A | 4/1998 | Grimmer, Jr. et al. |
| 5,740,178 | A | 4/1998 | Jacks et al. |
| 5,752,046 | A | 5/1998 | Oprescu et al. |
| 5,757,919 | A | 5/1998 | Herbert et al. |
| 5,764,969 | A | 6/1998 | Kahle et al. |
| 5,790,668 | A * | 8/1998 | Tomko ....................... 713/186 |
| 5,796,845 | A | 8/1998 | Serikawa et al. |
| 5,805,712 | A | 9/1998 | Davis |
| 5,809,546 | A | 9/1998 | Greenstein et al. |
| 5,815,665 | A | 9/1998 | Teper et al. |
| 5,825,880 | A | 10/1998 | Sudia et al. |
| 5,835,594 | A | 11/1998 | Albrecht et al. |
| 5,844,986 | A | 12/1998 | Davis |
| 5,852,717 | A | 12/1998 | Bhide et al. |
| 5,872,994 | A | 2/1999 | Akiyama et al. |
| 5,890,189 | A | 3/1999 | Nozue et al. |
| 5,901,225 | A | 5/1999 | Ireton et al. |
| 5,919,257 | A | 7/1999 | Trostle |
| 5,935,242 | A | 8/1999 | Madany et al. |
| 5,935,247 | A | 8/1999 | Pai et al. |
| 5,937,063 | A | 8/1999 | Davis |
| 5,944,821 | A | 8/1999 | Angelo |
| 5,953,502 | A | 9/1999 | Helbig, Sr. |
| 5,956,408 | A | 9/1999 | Arnold |
| 5,970,147 | A | 10/1999 | Davis et al. |
| 5,978,475 | A | 11/1999 | Schneier et al. |
| 5,978,481 | A | 11/1999 | Ganesan et al. |
| 5,987,557 | A | 11/1999 | Ebrahim |
| 6,014,745 | A | 1/2000 | Ashe |
| 6,035,374 | A | 3/2000 | Panwar et al. |
| 6,044,478 | A | 3/2000 | Green |
| 6,055,637 | A | 4/2000 | Hudson et al. |
| 6,058,478 | A | 5/2000 | Davis |
| 6,061,794 | A | 5/2000 | Angelo |
| 6,085,296 | A | 7/2000 | Karkhanis et al. |
| 6,088,262 | A | 7/2000 | Nasu |
| 6,092,095 | A | 7/2000 | Maytal |
| 6,093,213 | A | 7/2000 | Favor et al. |
| 6,101,584 | A | 8/2000 | Satou et al. |
| 6,108,644 | A | 8/2000 | Goldschlag et al. |
| 6,115,816 | A | 9/2000 | Davis |
| 6,125,430 | A | 9/2000 | Noel et al. |
| 6,131,166 | A | 10/2000 | Wong-Isley |
| 6,138,239 | A | 10/2000 | Veil |
| 6,148,379 | A | 11/2000 | Schimmel |
| 6,158,546 | A | 12/2000 | Hanson et al. |
| 6,173,417 | B1 | 1/2001 | Merrill |
| 6,175,924 | B1 | 1/2001 | Arnold |
| 6,175,925 | B1 | 1/2001 | Nardone et al. |
| 6,178,509 | B1 | 1/2001 | Nardone et al. |
| 6,188,257 | B1 | 2/2001 | Buer |
| 6,192,455 | B1 | 2/2001 | Bogin et al. |
| 6,199,152 | B1 | 3/2001 | Kelly et al. |
| 6,205,550 | B1 | 3/2001 | Nardone et al. |
| 6,212,635 | B1 | 4/2001 | Reardon |
| 6,222,923 | B1 | 4/2001 | Schwenk |
| 6,249,872 | B1 | 6/2001 | Wildgrube et al. |
| 6,252,650 | B1 | 6/2001 | Nakaumra |
| 6,269,392 | B1 | 7/2001 | Cotichini et al. |
| 6,272,533 | B1 | 8/2001 | Browne |
| 6,275,933 | B1 | 8/2001 | Fine et al. |
| 6,282,650 | B1 | 8/2001 | Davis |
| 6,282,651 | B1 | 8/2001 | Ashe |
| 6,282,657 | B1 | 8/2001 | Kaplan et al. |
| 6,292,874 | B1 | 9/2001 | Barnett |
| 6,301,646 | B1 | 10/2001 | Hostetter |
| 6,321,314 | B1 | 11/2001 | Van Dyke |
| 6,327,652 | B1 | 12/2001 | England et al. |
| 6,330,670 | B1 | 12/2001 | England et al. |
| 6,339,815 | B1 | 1/2002 | Feng et al. |
| 6,339,816 | B1 | 1/2002 | Bausch |
| 6,351,813 | B1 * | 2/2002 | Mooney et al. ............. 713/185 |
| 6,357,004 | B1 | 3/2002 | Davis |
| 6,363,485 | B1 | 3/2002 | Adams |
| 6,374,286 | B1 | 4/2002 | Gee et al. |
| 6,378,068 | B1 | 4/2002 | Foster |
| 6,378,072 | B1 | 4/2002 | Collins et al. |
| 6,389,537 | B1 | 5/2002 | Davis et al. |
| 6,393,565 | B1 * | 5/2002 | Lockhart et al. ............ 713/172 |
| 6,397,379 | B1 | 5/2002 | Yates, Jr. et al. |
| 6,412,035 | B1 | 6/2002 | Webber |
| 6,421,702 | B1 | 7/2002 | Gulick |
| 6,445,797 | B1 | 9/2002 | McGough et al. |
| 6,463,535 | B1 | 10/2002 | Drews et al. |
| 6,463,537 | B1 | 10/2002 | Tello |
| 6,473,508 | B1 | 10/2002 | Young et al. |

| | | |
|---|---|---|
| 6,473,800 B1 | 10/2002 | Jerger et al. |
| 6,496,847 B1 | 12/2002 | Bugnion et al. |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,741,991 B2 * | 5/2004 | Saito ............... 707/9 |
| 6,988,250 B1 | 1/2006 | Proudler et al. |
| 7,028,149 B2 | 4/2006 | Grawrock et al. |
| 7,133,990 B2 | 11/2006 | Link et al. |
| 7,165,181 B2 | 1/2007 | Brickell et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0004900 A1 | 1/2002 | Patel |
| 2002/0007456 A1 | 1/2002 | Peinado et al. |
| 2002/0023032 A1 | 2/2002 | Pearson et al. |
| 2002/0129261 A1 * | 9/2002 | Cromer et al. ............ 713/193 |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0002668 A1 | 1/2003 | Graunke et al. |
| 2003/0005317 A1 * | 1/2003 | Audebert et al. ........... 713/193 |
| 2003/0018892 A1 | 1/2003 | Tello |
| 2003/0074548 A1 | 4/2003 | Cromer et al. |
| 2003/0112008 A1 | 6/2003 | Hennig et al. |
| 2003/0115453 A1 | 6/2003 | Grawrock |
| 2003/0115468 A1 * | 6/2003 | Aull et al. ................. 713/175 |
| 2003/0126442 A1 | 7/2003 | Glew et al. |
| 2003/0126453 A1 | 7/2003 | Glew et al. |
| 2003/0133575 A1 * | 7/2003 | Challener ................. 380/277 |
| 2003/0159056 A1 | 8/2003 | Cromer et al. |
| 2003/0188156 A1 | 10/2003 | Yasala et al. |
| 2003/0188179 A1 | 10/2003 | Challener et al. |
| 2003/0196085 A1 | 10/2003 | Lampson et al. |
| 2003/0231328 A1 | 12/2003 | Chapin et al. |
| 2003/0235175 A1 | 12/2003 | Naghiam et al. |

FOREIGN PATENT DOCUMENTS

| | | |
|---|---|---|
| EP | 0473913 | 3/1992 |
| EP | 0602867 | 6/1994 |
| EP | 0600112 | 8/1994 |
| EP | 0892521 | 1/1999 |
| EP | 0961193 | 5/1999 |
| EP | 0930567 A | 7/1999 |
| EP | 0961193 | 12/1999 |
| EP | 0965902 | 12/1999 |
| EP | 1030237 A | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| FR | 2620248 | 3/1989 |
| FR | 2700430 | 12/1992 |
| FR | 2714780 | 12/1993 |
| FR | 2742618 | 11/1996 |
| FR | 2752122 | 2/1998 |
| FR | 2763452 | 11/1998 |
| FR | 2830147 | 3/2003 |
| JP | 02000076139 A | 3/2000 |
| WO | WO9524696 | 9/1995 |
| WO | WO97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO9957863 | 11/1999 |
| WO | WO99/65579 | 12/1999 |
| WO | IB 0021238 | 4/2000 |
| WO | WO0021238 | 4/2000 |
| WO | WO0062232 | 10/2000 |
| WO | WO 01/27723 A | 4/2001 |
| WO | WO 01/27821 A | 4/2001 |
| WO | WO0163994 | 8/2001 |
| WO | WO 01 75564 A | 10/2001 |
| WO | WO 01/75565 | 10/2001 |
| WO | WO 01/75595 | 10/2001 |
| WO | WO0201794 | 1/2002 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

Schneier, Bruce. Applied Cryptography, Second Edition, 1996 John Wiley & Sons, pp. 34-43.*

Trusted Computing Platform Alliance (TCPA). "TCPA Design Philosophies and Concepts, Version 1.0", 2000.*

Heinrich, J., "MIPS R4000 Microprocessor User's Manual," Apr. 1, 1993, MIPS, MT. VIEW, XP002184449, pp. 61-97.

Heinrich, J.:"MIPS R4000 Microprocessor User's Manual", 1994, MIPS Technology Inc., Mountain View, CA, pp. 67-79.

"M68040 User's Manual," 1993, Motorola, Inc., pp. 1-20.

"Intel 386 DX Microprocessor 32-Bit CHMOS Microprocessor With Integrated Memory Management," Dec. 31, 1995, Intel, Inc., pp. 32-56; figures 4-14.

Berg, C., "How Do I Create a Signed Applet?," Dr. Dobb's Journal, M&T Publ., Redwood City, CA, US, vol. 22, No. 8, Aug. 1997, pp. 109-111, 122.

Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Aug. 9, 2001; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

Brands, Stefan , "Restrictive Blinding of Secret-Key Certificates", *Springer-Verlag XP002201306*, (1995),Chapter 3.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn, et al., "Replacement Strategy for Aging Avionics Computers", *IEEE AES Systems Magazine*, XP002190614,(Mar. 1999).

Menezes, Oorschot, "Handbook of Applied Cryptography", *CRC Press LLC*, USA XP002201307, (1997),475.

Richt, Stefan, et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Saez, Sergio, et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering, University of California*, San Diego, La Jolla, CA, (Nov. 2001).

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors* (ICCD '86), (Oct. 6, 1986),.155-160.

Fabry, R.S., "Capability-Based Addressing", Fabry, R.S., "*Capability-Based Addressing,*" Communication of the ACM, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

HP Mobile Security Overview, "HP Mobile Security Overview", (Sep. 2002),1-10.

IBM CORPORATION, "IBM ThinkPad T30 Notebooks", *IBM Product Specification*, located at www-1.ibm,com/services/files/cisco_t30_spec_sheet_070202.pdf, last visited Jun. 23, 2004,(Jul. 2, 2002),1-6.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000), 1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA SECURITY, "Hardware Authenticators", www.rsasecurity.com/node.asp?id=1158, 1-2.

RSA SECURITY, "RSA SecurID Authenticators", www.rsasecurity.com/products/securid/datasheets/SID_DS_0103.pdf, 1-2.

RSA SECURITY, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", *2nd Edition; Wiley, John & Sons, Inc.*, XP002251738; ISBN 0471128457,(Nov. 1995),28-33; 176-177; 216-217; 461-473; 518-522.

Trusted Computing Platform Alliance (TCPA) Main Specification Version 1.1B—PCTA Main Specification, XX, XX, Feb. 22, 2002 Page complete 332, XP002294897—p. 68, p. 97-110, p. 145-168.

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

"A Practical and Provable Secure Coalition-Resistant Group Signature Scheme"; G. Ateniese, et al., CRYPTO2000, vol. 1880 of Lecture Notes in Computer Science ACM SIGARCH Computer Architecture News, 16 pgs (2000).

"Virtualizing the VAX Architecture"; J. Hall, et al, Proaceedings of teh 18th Annual International Symposium on Computer Architecture, vol. 19, Issue No. 3, pp. 380-389 (1991).

Hardware Debugger Facilities', Jonathan Rosenberg, Wiley Computer Publishing, U.S., pp. 42-43, 95, 96 and 99 (1996).

* cited by examiner

ATTESTATION USING BOTH FIXED TOKEN AND PORTABLE TOKEN

BACKGROUND

The Trusted Platform Computing Alliance (TPCA) Main Specification, Version 1.1b, 22 Feb. 2002 (hereinafter "TCPA SPEC") describes a Trusted Platform Module (TPM) or token that is affixed to and/or otherwise irremovable from a computing device or platform. This fixed token supports auditing and logging of software processes, platform boot integrity, file integrity, and software licensing. Further, the fixed token provides protected storage where items can be protected from exposure or improper use, and provides an identity that may be used for attestation. These features encourage third parties to grant the computing device or platform access to information that would otherwise be denied.

Third parties may utilize remote computing devices to establish a level of trust with the computing device using the attestation mechanisms of the fixed token. However, the processes by which this level of trust is established typically require that a remote computing device of the third party perform complex calculations and participate in complex protocols with the fixed token. However, a local user of the platform may also want to establish a similar level of trust with the local platform or computing device. It is impractical, however, for a local user to perform the same complex calculations and participate in the same complex protocols with the fixed token as the remote computing devices in order to establish trust in the computing device.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are described in order to provide a thorough understanding of the invention. However, the present invention may be practiced without these specific details. In other instances, well-known methods, procedures, components and circuits have not been described in detail so as not to obscure the present invention. Further, example sizes/models/values/ranges may be given, although some embodiments may not be limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Further, the term "blob" (binary large object) is commonly used in the database arts to refer to any random large block of bits that needs to be stored in a database in a form that cannot be interpreted by the database itself. However, as used herein, the term "blob" is intended to have a much broader scope. In particular, the term "blob" is intended to be a broad term encompassing any grouping of one or more bits regardless of structure, format, representation, or size.

Furthermore, the verb "hash" and related forms are used herein to refer to performing an operation upon an operand or message to produce a value or a "hash". Ideally, the hash operation generates a hash from which it is computationally infeasible to find a message with that hash and from which one cannot determine any usable information about a message with that hash. Further, the hash operation ideally generates the hash such that determining two messages which produce the same hash is computationally impossible. While the hash operation ideally has the above properties, in practice one way functions such as, for example, the Message Digest 5 algorithm (MD5) and the Secure Hashing Algorithm 1 (SHA-1) generate hash values from which deducing the message are difficult, computationally intensive, and/or practically infeasible.

Moreover, the terms "first", "second", "third", etc. are used herein as labels to distinguish between similarly named components and/or operations. In particular, such terms are not used to signify and are not meant to signify an ordering of components and/or operations. Further, such terms are not used to signify and are not meant to signify one component and/or operation having greater importance than another.

Figure 1:
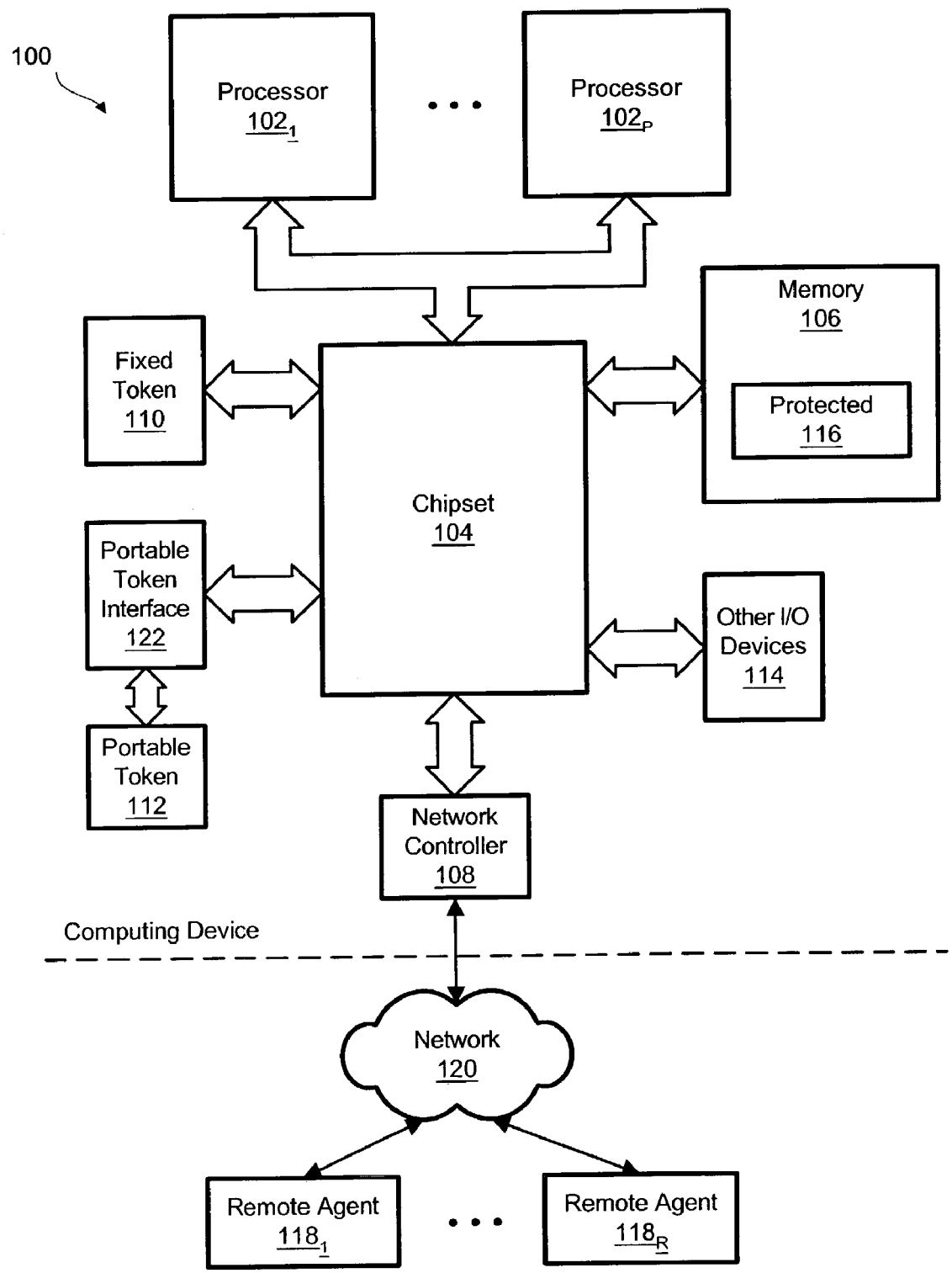
FIG. 1 illustrates an example computing device comprising a fixed token and a portable token.

Now referring to FIG. 1, an example computing device 100 is shown. The computing device 100 may comprise one or more processors $102_1 \ldots 102_P$. The processors $102_1 \ldots 102_P$ may support one or more operating modes such as, for example, a real mode, a protected mode, a virtual 8086 mode, and a virtual machine extension mode (VMX mode). Further, the processors $102_1 \ldots 102_P$ may support one or more privilege levels or rings in each of the supported operating modes. In general, the operating modes and privilege levels of processors $102_1 \ldots 102_P$ define the instructions available for execution and the effect of executing such instructions. More specifically, the processors $102_1 \ldots 102_P$ may be permitted to execute certain privileged instructions only if the processors $102_1 \ldots 102_P$ is in an appropriate mode and/or privilege level.

The chipset 104 may comprise one or more integrated circuit packages or chips that couple the processors $102_1 \ldots 102_P$ to memory 106, a network interface 108, a fixed token 110, a portable token 112, and other I/O devices 114 of the computing device 100 such as, for example, a mouse, keyboard, disk drive, video controller, etc. The chipset 104 may comprise a memory controller (not shown) for writing and reading data to and from the memory 106.

Further, the chipset 104 and/or the processors 102₁ . . . 102_P may define certain regions of the memory 106 as protected memory 116. In one embodiment, the processors 102₁ . . . 102_P may access the protected memory 116 only when in a particular operating mode (e.g. protected mode) and privilege level (e.g. 0P).

The network interface 108 generally provides a communication mechanism for the computing device 100 to communicate with one or more remote agents 118₁ . . . 118_R (e.g. certification authorities, retailers, financial institutions) via a network 120. For example, the network interface 108 may comprise a Gigabit Ethernet controller, a cable modem, a digital subscriber line (DSL) modem, plain old telephone service (POTS) modem, etc. to couple the computing device 100 to the one or more remote agents 118₁ . . . 118_R.

The fixed token 110 may be affixed to or incorporated into the computing device 100 to provide some assurance to remote agents 118₁ . . . 118_R and/or a local user that the fixed token 110 is associated only with the computing device 100. For example, the fixed token 110 may be incorporated into one of the chips of the chipset 104 and/or surface mounted to the mainboard (not shown) of the computing device 100. In general, the fixed token 110 may comprise protected storage for metrics, keys and secrets and may perform various integrity functions in response to requests from the processors 102₁ . . . 102_P and the chipset 104. In one embodiment, the fixed token 110 may store metrics in a trusted manner, may quote metrics in a trusted manner, may seal secrets to a particular environment (current or future), and may unseal secrets to the environment to which they were sealed. Further, the fixed token 110 may load keys of a sealed key blob and may establish sessions that enable a requester to perform operations using a key associated with the established session.

The portable token 112 may establish a link to the processors 102₁ . . . 102_P via a portable token interface 122 of the computing device 100. The portable token interface 122 may comprise a port (e.g. USB port, IEEE 1394 port, serial Port, parallel port), a slot (e.g. card reader, PC Card slot, etc.), transceiver (e.g. RF transceiver, Infrared transceiver, etc.), and/or some other interface mechanism than enables the portable token 112 to be easily coupled to and removed from the computing device 100. Similar to the fixed token 110, the portable token 112 may comprise protected storage for keys and secrets and may perform various integrity functions in response to requests from the processors 102₁ . . . 102_P and the chipset 104. In one embodiment, the portable token 112 may load keys of a sealed key blob, and may establish sessions that enable a requester to perform operations using a key associated with the established session. Further, the portable token 112 may change usage authorization data associated with a sealed key blob, and may return a sealed key blob of a protected key blob after determining that a requester is authorized to receive the sealed key blob.

Figure 2:
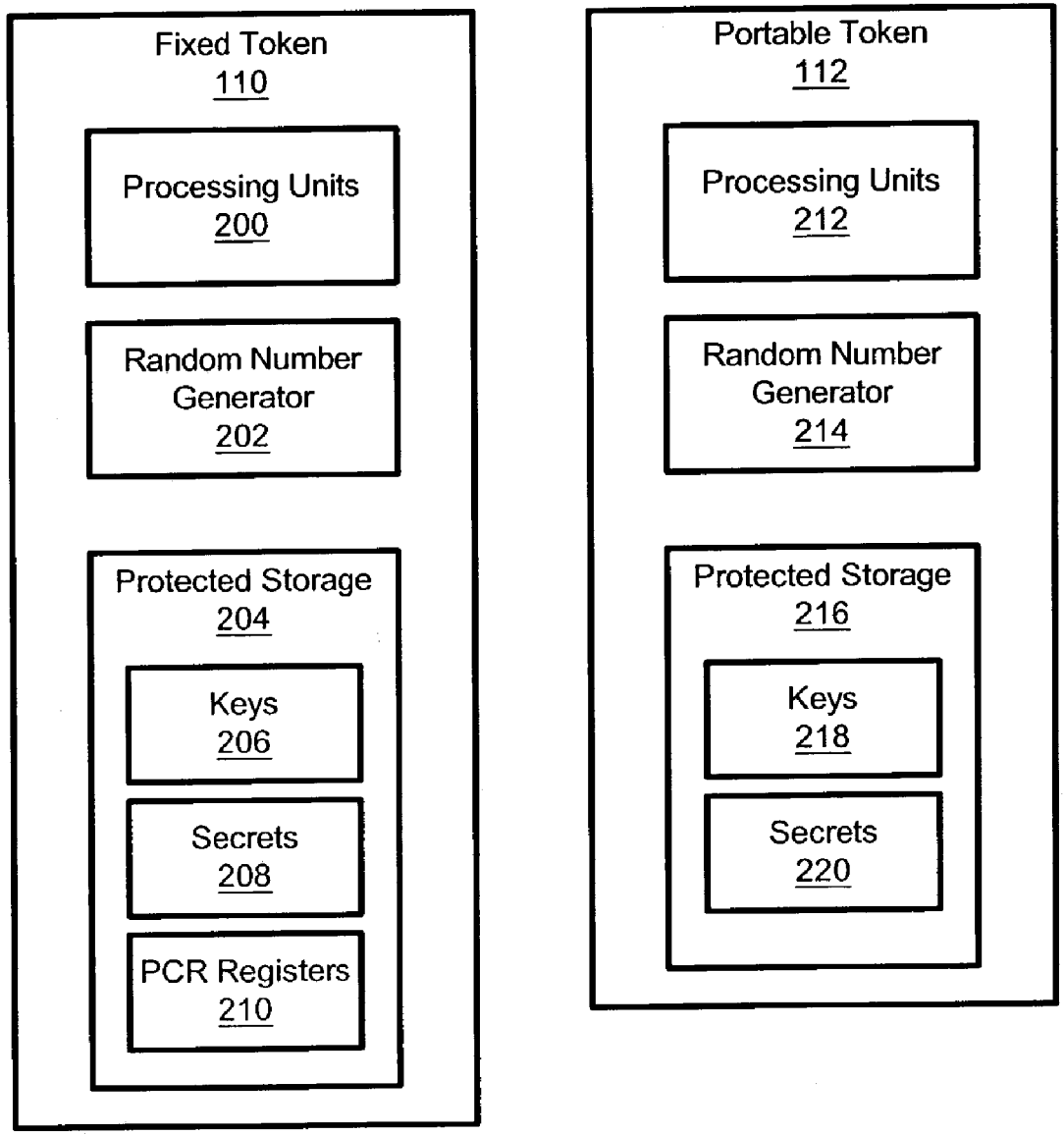
FIG. 2 illustrates an example fixed token and an example portable token of FIG. 1.

As illustrated in FIG. 2, the fixed token 110 may comprise one or more processing units 200, a random number generator 202, and protected storage 204 which may comprise keys 206, secrets 208, and/or one or more platform configuration register (PCR) registers 210 for metrics. Similarly, the portable token 112 may comprise one or more processing units 212, a random number generator 214, and protected storage 216 which may comprise keys 218 and/or secrets 220. The processing units 200, 212 may perform integrity functions for the computing device 100 such as, for example, generating and/or computing symmetric and asymmetric keys. In one embodiment, the processing units 200, 212 may use the generated keys to encrypt and/or sign information. Further, the processing units 200, 212 may generate the symmetric keys based upon an AES (Advanced Encryption Standard), a DES (Data Encryption Standard), 3DES (Triple DES), or some other symmetric key generation algorithm that has been seeded with a random number generated by the random number generators 202, 214. Similarly, the processing units 200, 212 may generate the asymmetric key pairs based upon an RSA (Rivest-Shamir-Adleman), EC (Elliptic Curve), or some other asymmetric key pair generation algorithm that has been seeded with a random number generated by the random number generators 202, 214.

In one embodiment, both the fixed token 110 and the portable token 112 may generate immutable symmetric keys and/or asymmetric key pairs from symmetric and asymmetric key generation algorithms seeded with random numbers generated by their respective random number generator 202, 214. In general, these immutable keys are unalterable once the tokens 110, 112 activate them. Since the immutable keys are unalterable after activation, the immutable keys may be used as part of a mechanism to uniquely identify the respective token 110, 112. Besides the immutable keys, the processing units 200, 212 may further generate one or more supplemental asymmetric key pairs in accordance with an asymmetric key generation algorithm. In an example embodiment, the computing device 100 may generate supplemental asymmetric key pairs as needed whereas the immutable asymmetric key pairs are immutable once activated. To reduce exposure of the immutable asymmetric key pairs to outside attacks, the computing device 100 typically utilizes its supplemental asymmetric key pairs for most encryption, decryption, and signing operations. In particular, the computing device 100 typically provides the immutable public keys to only a small trusted group of entities such as, for example, a certification authority. Further, the fixed token 110 of the computing device 100 in one embodiment never provides a requester with an immutable private key and only provides a requester with a mutable private key after encrypting it with one of its immutable public keys and/or one of its other supplemental asymmetric keys.

Accordingly, an entity may be reasonably assured that information encrypted with one of the supplemental public keys or one of the immutable public keys may only be decrypted with the respective token 110, 112 or by an entity under the authority of the respective token 110, 112. Further, the portable token 112 may provide some assurance to the computing device 100 and/or remote agents 118₁ . . . 118_R that a user associated with the portable token 112 is present or located at or near the computing device 100. Due to uniqueness of the portable token 112 and an assumption that the user is in control of the portable token 112, the computing device 100 and/or remote agents 118₁ . . . 118_R may reasonably assume that the user of the portable token 112 is present or the user has authorized someone else to use the portable token 112.

The one or more PCR registers 210 of the fixed token 110 may be used to record and report metrics in a trusted manner. To this end, the processing units 200 may support a PCR quote operation that returns a quote or contents of an identified PCR register 210. The processing units 200 may also support a PCR extend operation that records a received metric in an identified PCR register 210. In particular, the PCR extend operation may (i) concatenate or append the received metric to an metric stored in the identified PCR register 210 to obtain an appended metric, (ii) hash the appended metric to obtain an updated metric that is representative of the received metric and previously metrics recorded by the identified PCR register 210, and (iii) store the updated metric in the PCR register 210.

The fixed token 110 and the portable token 112 in one embodiment both provide support for establishing sessions between a requester and the tokens 110, 112. In particular, the fixed token 110 and the portable token 112 in one embodiment both implement the Object-Specific Authentication Protocol (OS-AP) described in the TCPA SPEC to establish sessions. Further, both the fixed token 110 and the portable token 112 both implement the TPM_OSAP command of the TCPA SPEC results in the token 110, 112 establishing a session in accordance with the OS-AP protocol. In general, the OS-AP protocol requires that a requester provide a key handle that identifies a key of the token 110, 112. The key handle is merely a label that indicates that the key is loaded and a mechanism to locate the loaded key. The token 110, 112 then provides the requester with an authorization handle that identifies the key and a shared secret computed from usage authorization data associated with the key. When using the session, the requester provides the token 110, 112 with the authorization handle and a message authentication code (MAC) that both provides proof of possessing the usage authorization data associated with the key and attestation to the parameters of the message/request. In one embodiment, the requester and tokens 110, 112 further compute the authentication code based upon a rolling nonce paradigm where the requester and tokens 110, 112 both generate random values or nonces which are included in a request and its reply in order to help prevent replay attacks.

The processing units 200 of the fixed token 110 may further support a seal operation. The seal operation in general results in the fixed token 110 sealing a blob to a specified environment and providing a requesting component such as, for example, the monitor 310, the kernel 332, trusted applets 334, operating system 322, and/or application 324 with the sealed blob. In particular, the requesting component may establish a session for an asymmetric key pair of the fixed token 110. The requesting component may further provide the fixed token 110 via the established session with a blob to seal, one or more indexes that identify PCR registers 210 to which to seal the blob, and expected metrics of the identified PCR registers 210. The fixed token 110 may generate a seal record that specifies the environment criteria (e.g. quotes of identified PCR registers 210), a proof value that the fixed token 110 may later use to verify that the fixed token 110 created the sealed blob, and possibly further sensitive data to which to seal the blob. The fixed token 110 may further hash one or more portions of the blob to obtain a digest value that attests to the integrity of the one or more hashed portions of the blob. The fixed token 110 may then generate the sealed blob by encrypting sensitive portions of the blob such as, usage authorization data, private keys, and the digest value using an asymmetric cryptographic algorithm and the public key of the established session. The fixed token 110 may then provide the requesting component with the sealed blob.

The processing units 200 of the fixed token 110 may also support an unseal operation. The unseal operation in general results in the fixed token 110 unsealing a blob only if the blob was sealed with a key of the fixed token 110 and the current environment satisfies criteria specified for the sealed blob. In particular, the requesting component may establish a session for an asymmetric key pair of the fixed token 110, and may provide the fixed token 110 with a sealed blob via the established session. The fixed token 110 may decrypt one or more portions of the sealed blob using the private key of the established session. If the private key corresponds to the public key used to seal the sealed blob, then the fixed token 110 may obtain plain-text versions of the encrypted data from the blob. Otherwise, the fixed token 110 may encounter an error condition and/or may obtain corrupted representations of the encrypted data. The fixed token 110 may further hash one or more portions of the blob to obtain a computed digest value for the blob. The fixed token 110 may then return the blob to the requesting component in response to determining that the computed digest value equals the digest value obtained from the sealed blob, the metrics of the PCR registers 210 satisfy the criteria specified by the seal record obtained from the sealed blob, and the proof value indicates that the fixed token 110 created the sealed blob. Otherwise, the fixed token 110 may abort the unseal operation and erase the blob, the seal record, the digest value, and the computed digest value from the fixed token 110.

The above example seal and unseal operations use a public key to seal a blob and a private key to unseal a blob via an asymmetric cryptographic algorithm. However, the fixed token 110 may use a single key to both seal a blob and unseal a blob using a symmetric cryptographic algorithm. For example, the fixed token 110 may comprise an embedded key that is used to seal and unseal blobs via a symmetric cryptographic algorithm, such as, for example DES, 3DES, AES, and/or other algorithms.

It should be appreciated that the fixed token 110 and portable token 112 may be implemented in a number of different manners. For example, the fixed token 110 and portable token 112 may be implemented in a manner similar to Trusted Platform Module (TPM) described in detail in the TCPA SPEC. However, a cheaper implementation of the portable token 112 with substantially fewer features and functionality than the TPM of the TCPA SPEC may be suitable for some usage models such as local attestation. Further, the fixed token 110 and the portable token 112 may establish sessions and/or authorize use of its keys in a number of different manners beyond the OS-AP protocol described above.

Figure 3:
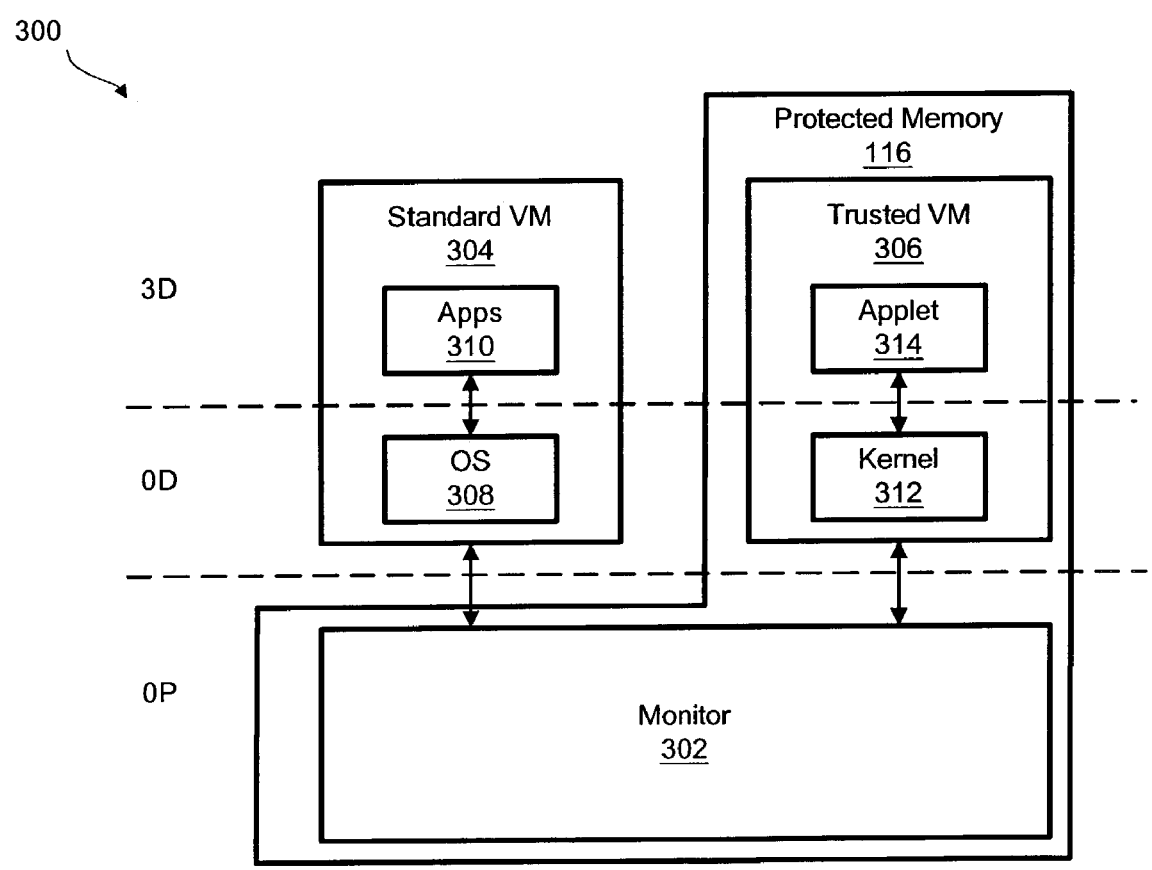
FIG. 3 illustrates an example trusted environment that may be implemented by the computing device of FIG. 1.

An example trusted environment 300 is shown in FIG. 3. The computing device 100 may utilize the operating modes and the privilege levels of the processors $102_1 \ldots 102_P$ to establish the trusted environment 300. As shown, the trusted environment 300 may comprise a trusted virtual machine kernel or monitor 302, one or more standard virtual machines (standard VMs) 304, and one or more trusted virtual machines (trusted VMs) 306. The monitor 302 of the trusted environment 300 executes in the protected mode at the most privileged processor ring (e.g. 0P) to manage security and privilege barriers between the virtual machines 304, 306.

The standard VM 304 may comprise an operating system 308 that executes at the most privileged processor ring of the VMX mode (e.g. 0D), and one or more applications 310 that execute at a lower privileged processor ring of the VMX mode (e.g. 3D). Since the processor ring in which the monitor 302 executes is more privileged than the processor ring in which the operating system 308 executes, the operating system 308 does not have unfettered control of the computing device 100 but instead is subject to the control and restraints of the monitor 302. In particular, the monitor 302 may prevent the operating system 308 and its applications 310 from accessing protected memory 116 and the fixed token 110.

The monitor 302 may perform one or more measurements of the trusted kernel 312 such as a hash of the kernel code to obtain one or more metrics, may cause the fixed token 110 to extend an identified PCR register 210 with the metrics of the trusted kernel 312, and may record the metrics in an associated PCR log stored in protected memory 116. Further, the monitor 302 may establish the trusted VM 306 in protected memory 116 and launch the trusted kernel 312 in the established trusted VM 306.

Similarly, the trusted kernel 312 may take one or more measurements of an applet or application 314 such as a hash of the applet code to obtain one or more metrics. The trusted kernel 312 via the monitor 302 may then cause the fixed token 110 to extend an identified PCR register 210 with the metrics of the applet 314. The trusted kernel 312 may further record the metrics in an associated PCR log stored in protected memory 116. Further, the trusted kernel 312 may launch the trusted applet 314 in the established trusted VM 306 of the protected memory 116.

In response to initiating the trusted environment 300 of FIG. 3, the computing device 100 may further record metrics of the monitor 302, the processors $102_1 \ldots 102_P$, the chipset 104, BIOS firmware (not shown), and/or other hardware/software components of the computing device 100. Further, the computing device 100 may initiate the trusted environment 300 in response to various events such as, for example, system startup, an application request, an operating system request, etc.

Figure 4:
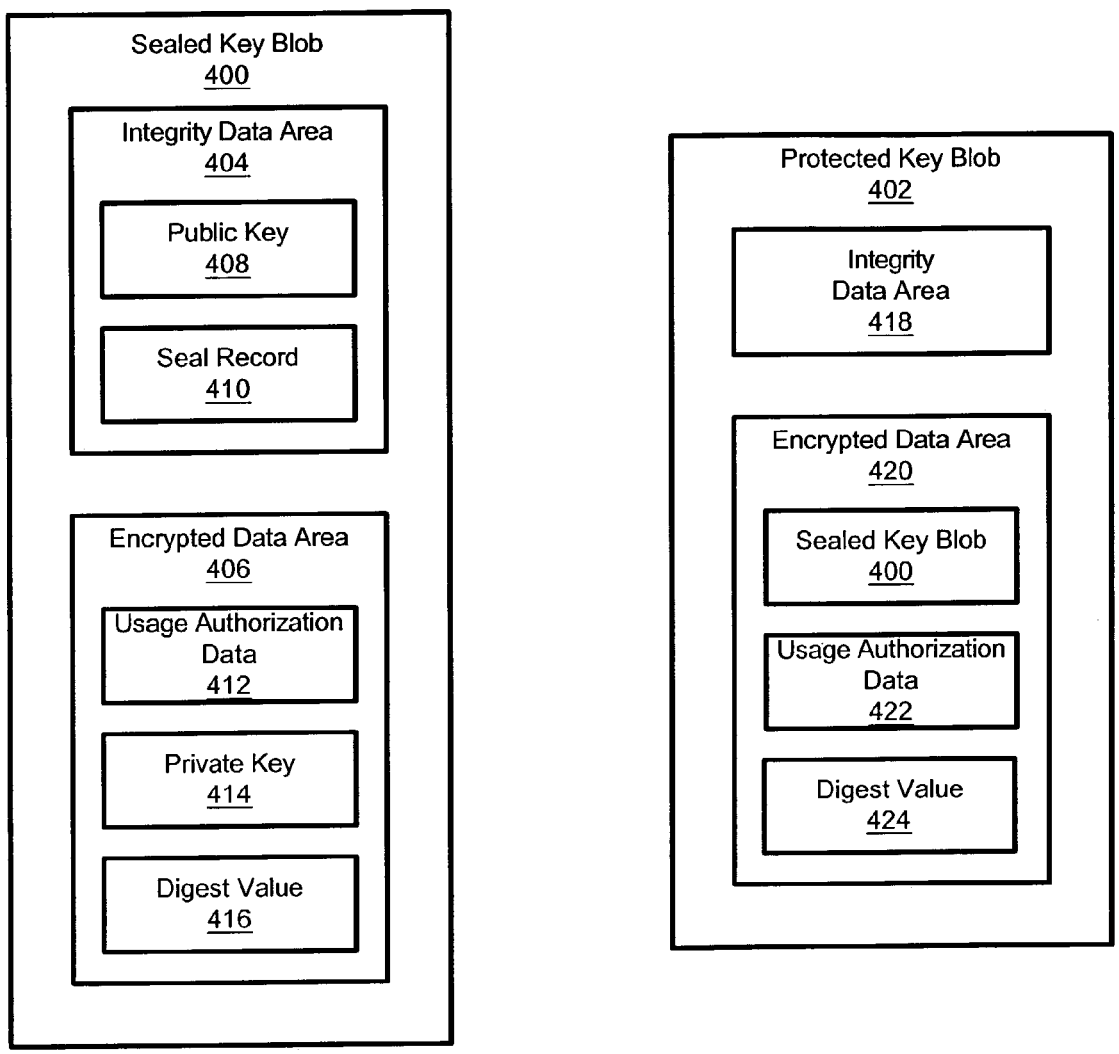
FIG. 4 illustrates an example sealed key blob and an example protected key blob that may be used by the computing device of FIG. 1 for local attestation.

Referring now to FIG. 4, there is shown a sealed key blob 400 and a protected key blob 402 that may be used for local attestation. As depicted, the sealed key blob 400 may comprise one or more integrity data areas 404 and one or more encrypted data areas 406. The integrity data areas 404 may comprise a public key 408, a seal record 410, and possibly other non-sensitive data such as a blob header that aids in identifying the blob and/or loading the keys of the blob. Further, the encrypted data areas 406 may comprise usage authorization data 412, a private key 414, and a digest value 416. The seal record 410 of the integrity data areas 404 may indicate to which PCR registers 210, corresponding metrics, proof values, and possible other sensitive data the asymmetric key pair 408, 414 was sealed. Further, the digest value 416 may attest to the data of the integrity data areas 404 and may also attest to the data of the encrypted data areas 406 to help prevent attacks obtaining access to data of the encrypted data areas 406 by altering one or more portions of the sealed key blob 400. In one embodiment, the digest value 416 may be generated by performing a hash of the integrity data areas 404, the usage authorization data 412, and the private key 414. In one embodiment, data is stored in the integrity data areas 404 in a plain-text or not encrypted form thus allowing the data of the integrity data area to be read or changed without requiring a key to decrypt the data. Further, the data of the encrypted data areas 406 in one embodiment is encrypted with a public key 206 of the fixed token 110. As is described in more detail in regard to FIG. 6, a requesting component is unable to successfully load the asymmetric key pair 408, 414 of the sealed key blob 400 into the fixed token 110 without establishing a session with the fixed token 110 to use the private key 206 corresponding to the public key 206 used to encrypt the data. Further, the requesting component is unable to successfully load the asymmetric key pair 408, 416 without providing the fixed token 110 with the usage authorization data 412 or proof of having the usage authorization data 412 for the sealed key blob 400 and the environment satisfying criteria specified by the seal record 410.

The protected key blob 402 may comprise one or more integrity data areas 418 and one or more encrypted data areas 420. The integrity data areas 418 may comprise non-sensitive data such as a blob header that aids in identifying the blob. Further, the encrypted data areas 420 may comprise usage authorization data 422, the sealed key blob 400, and a digest value 424. The digest value 424 may attest to the data of the integrity data areas 418 and may also attest to the data of the encrypted data areas 420 to help prevent attacks obtaining access to data of the encrypted data areas 420 by altering one or more portions of the protected key blob 402. In one embodiment, the digest value 424 may be generated by performing a hash of the integrity data areas 418, the sealed key blob 400, and the usage authorization data 422. In one embodiment, data is stored in the integrity data areas 418 in a plain-text or not encrypted form thus allowing the data of the integrity data area to be read or changed without requiring a key to decrypt the data. Further, the data of the encrypted data areas 420 in one embodiment is encrypted with a public key 216 of the portable token 112. As is described in more detail in regard to FIG. 6, a requesting component is unable to successfully obtain the sealed key blob 400 from the protected key blob 402 without establishing a session with the portable token 112 to use the corresponding private key 216. Further, the requesting component is unable to successfully obtain the sealed key blob 400 without providing the portable token 112 with the usage authorization data 422 or proof of having the usage authorization data 422 for the protected key blob 402.

Figure 5:
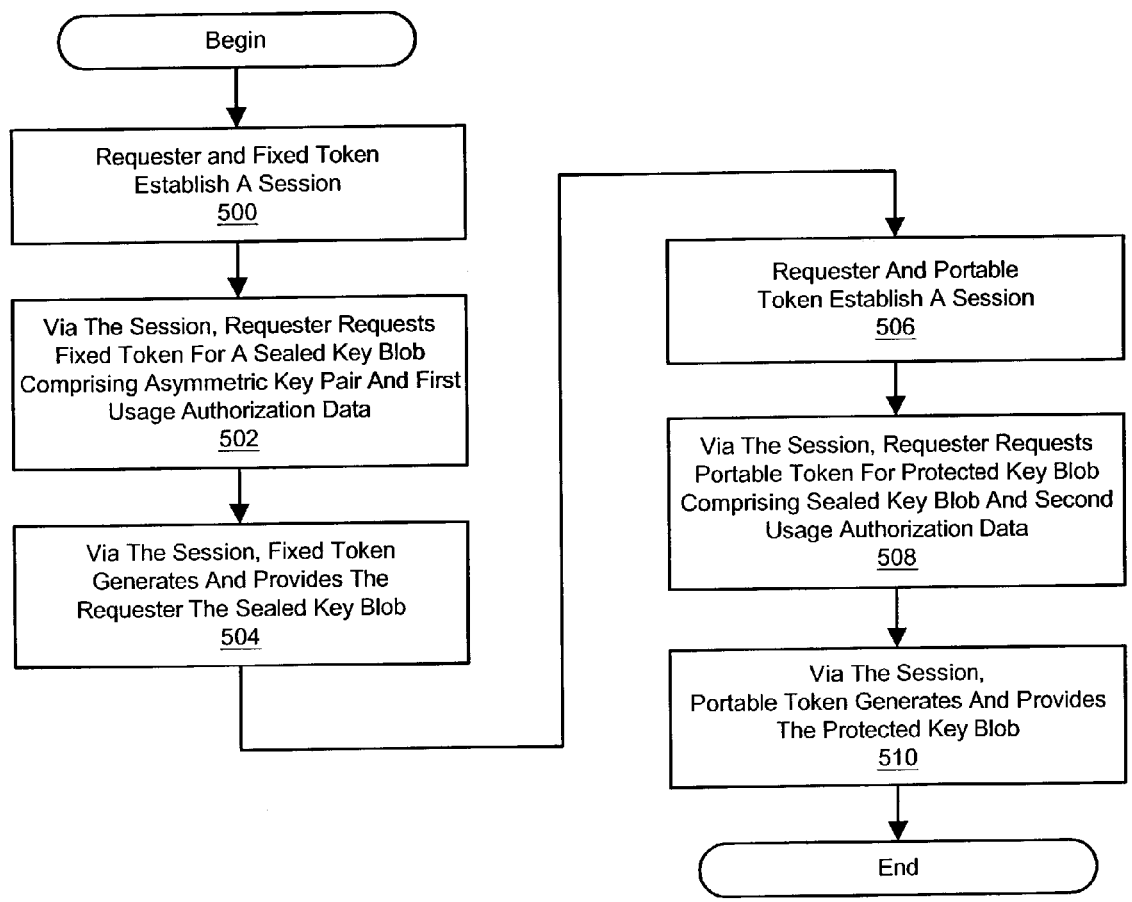
FIG. 5 illustrates an example method to create the protected key blob of FIG. 4.
Figure 6:
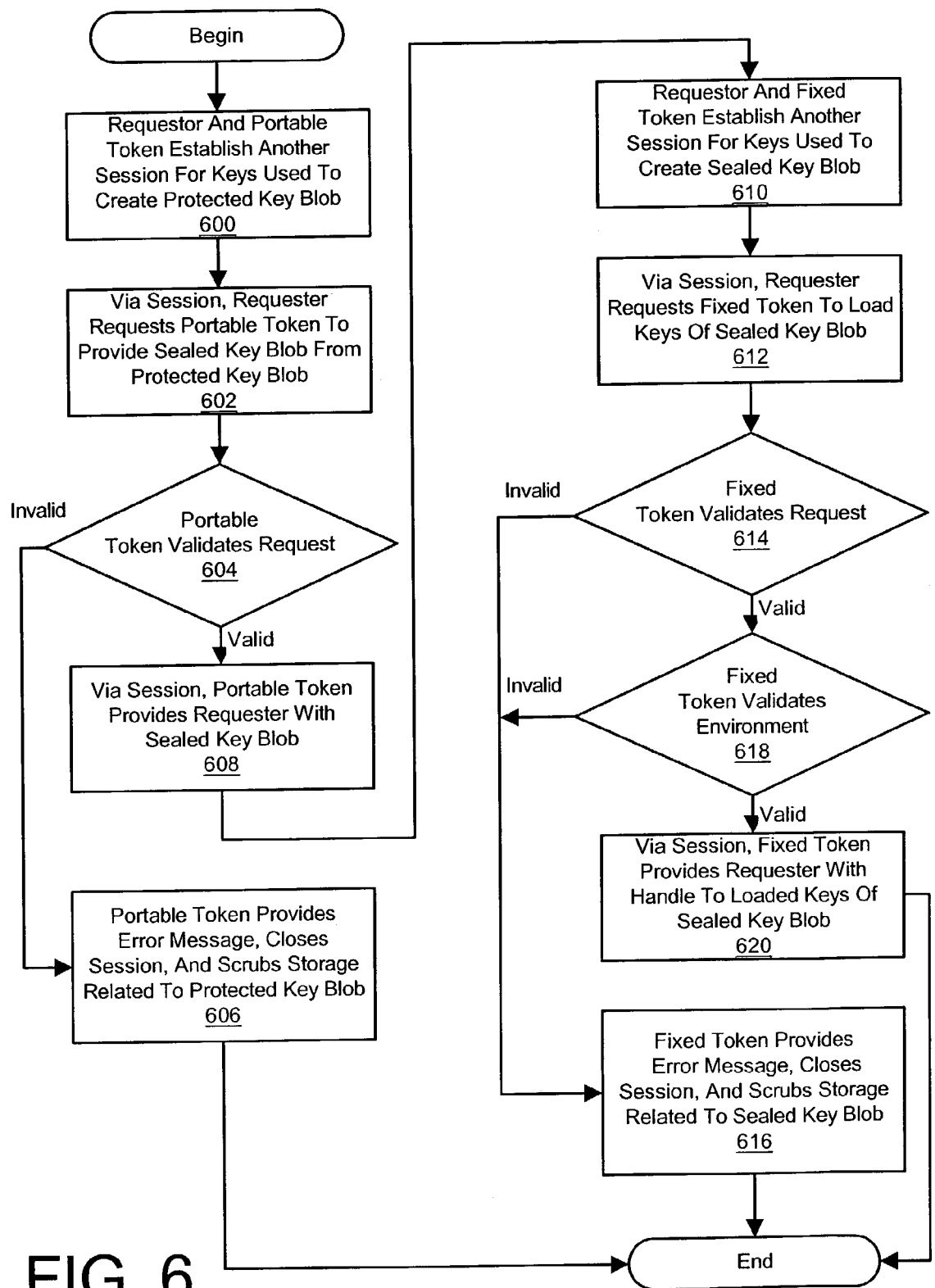
FIG. 6 illustrates an example method to load keys of the protected key blob of FIG. 4.

Referring now to FIG. 5 and FIG. 6, there is shown a method to create a protected key blob 402 and a method to use the sealed key blob. In general, the methods of FIG. 5 and FIG. 6 are initiated by a requester. In order to simplify the following description, the requester is assumed to be the monitor 302. However, the requester may be other modules such as, for example, the trusted kernel 312 and/or trusted applets 314 under the permission of the monitor 302. Further, the following assumes the requester and the tokens 110, 112 already have one or more key handles that identify keys 206, 218 stored in protected storage 204, 214 and associated usage authorization data. For example, the requester and the tokens 110, 112 may have obtained such information as a result of previously executed key creation and/or key loading commands. In particular, the following assumes that the requester is able to successfully establish sessions to use key pairs of the tokens 110, 112. However, it should be appreciated that if the requester is not authorized to use the key pairs then the requester will be unable to establish the sessions, and therefore will be unable to generate the respective key blobs using such key pairs and will be unable to load key pairs of key blobs created with such key pairs.

In FIG. 5, a method to generate the sealed key blob of FIG. 4 is shown. In block 500, the monitor 302 and the fixed token 110 may establish a session for an asymmetric key pair of the fixed token 110 that comprises a private key 206 and a corresponding public key 206 stored in protected storage 204 of the fixed token 110. In block 502, the monitor 302 may request via the established session that the fixed token 110 create a sealed key blob 400. In particular, the monitor 302, may provide the fixed token 110 with usage authorization data 412 for the sealed key blob 400. Further, the monitor 302 may provide the fixed token 110 with one or more indexes or identifiers that identify PCR registers 210 to which the fixed token 110 is to seal the keys 408, 414 of the sealed key blob 400 and may provide the fixed token 110 with metrics that are expected to be stored in identified PCR registers 210

The fixed token 110 in block 504 may create and return the requested sealed key blob 400. In particular, the fixed token 110 may generate a asymmetric key pair 408, 414 comprising a private key 414 and a corresponding public key 408 and may store the asymmetric key pair 408, 414 in its protected storage 204. Further, the fixed token 110 may seal the asymmetric key pair 408, 414 and the usage authorization data 412 to an environment specified by metrics of the PCR registers 210 that were identified by the monitor 302. As a result of sealing, the fixed token 110 may generate a seal record 410 that identifies PCR registers 210, metrics of the identified PCR registers 210, a proof value, and a digest value 416 that attests to asymmetric key pair 408, 414, the usage authorization data 412, and the seal record 410. The fixed token 110 may further create the encrypted data areas 406 of the sealed key blob 400 by encrypting the private key 414, the usage authorization data 412, the digest value 416, and any other sensitive data of the sealed key blob 400 with the public key 206 of the established session. By creating the encrypted data areas 406 with the public key 206 of the session, the fixed token 110 may prevent access to the data of the encrypted data areas 406 since such data may only be decrypted with the corresponding private key 206 which is under the control of the fixed token 110. The fixed token 110 may then return to the monitor 302 the requested sealed key blob 400.

In block 506, the monitor 302 and the portable token 112 may establish a session for an asymmetric key pair that comprises a private key 218 and a corresponding public key 218 stored in protected storage 216 of the portable token 112. The monitor 302 in block 508 may request via the established session that the portable token 112 generate from the sealed key blob 400 a protected key blob 402 which has usage authorization data 422. In particular, the monitor 302 may provide the portable token 112 with the sealed key blob 400 and the usage authorization data 422.

The portable token 112 in block 510 may create and return the requested protected key blob 402. In particular, the portable token 112 may seal the usage authorization data 422 and the sealed key blob 400 to the portable token 112. As a result of sealing, the portable token 112 may generate a digest value 424 that attests to the usage authorization data 422 and the sealed key blob 400. The portable token 112 may further create encrypted data areas 420 by encrypting the usage authorization data 422, the sealed key blob, the digest value 424, and any other sensitive data of the protected key blob 402 with the public key 218 of the established session. By creating the encrypted data areas 420 with the public key 218 of the session, the portable token 112 may prevent access to the data of the encrypted data areas 420 since such data may only be decrypted with the corresponding private key 218 which is under the control of the portable token 112. The portable token 112 may then return to the monitor 302 the requested protected key blob 402.

Referring now to FIG. 6, there is shown a method of loading the asymmetric key pair 408, 414 of the protected key blob 402. In block 600, the monitor 302 and portable token 112 may establish a session for the asymmetric key pair of the portable token 112 that was used to create the protected key blob 402. In block 602, the monitor 302 may request the portable token 112 to return the sealed key blob 400 stored in the protected key blob 402. To this end, the monitor 302 may provide the portable token 112 with the protected key blob 402 and an authentication code that provides proof of possessing or having knowledge of the usage authorization data 422 for the protected key blob 402. The monitor 302 may provide the portable token 112 with the authentication code in a number of different manners. In one embodiment, the monitor 302 may simply encrypt its copy of the usage authorization data 422 using the public key 218 of the established session and may provide the portable token 112 with the encrypted copy of its usage authorization data 422.

In another embodiment, the monitor 302 may generate a message authentication code (MAC) that provides both proof of possessing the usage authorization data 422 and attestation of one or more parameters of the request. In particular, the monitor 302 may provide the portable token 112 with a MAC resulting from applying the HMAC algorithm to a shared secret comprising or based upon the second usage authorization data and a message comprising one or more parameters of the request. The HMAC algorithm is described in detail in Request for Comments (RFC) 2104 entitled "HMAC: Keyed-Hashing for Message Authentication." Basically, the HMAC algorithm utilizes a cryptographic hash function such as, for example, the MD5 or SHA-1 algorithms to generate a MAC based upon a shared secret and the message being transmitted. In one embodiment, the monitor 302 and portable token 112 may generate a shared secret for the HMAC calculation that is based upon the second usage authorization data and rolling nonces generated by the monitor 302 and the portable token 112 for the established session. Moreover, the monitor 302 may generate one or more hashes of the parameters of the request and may compute the MAC via the HMAC algorithm using the computed shared secret and the parameter hashes as the message.

In block 604, the portable token 112 may validate the protected key blob 402 and the request for the sealed key blob 400. In one embodiment, the portable token 112 may compute the authentication code that the portable token 112 expects to receive from the monitor 302. In particular, the portable token 112 may decrypt the protected key blob 402 to obtain the sealed key blob 400 and the usage authorization data 422 for the protected key blob 402. The portable token 112 may then compute the authentication code or MAC in the same manner as the monitor 302 using the parameters received from the request and the usage authorization data 422 obtained from the protected key blob 402. In response to determining that the computed authentication code or MAC does not have the predetermined relationship (e.g. equal) to the authentication code or MAC received from the monitor 302, the portable token 112 may return an error message, may close the established session, may scrub the protected key blob 402 and associated data from the portable token 112, and may deactivate the portable token 112 in block 606. Further, the portable token 112 in block 604 may verify that protected key blob 402 has not been altered. In particular, the portable token 112 may compute a digest value based upon the usage authorization data 422 and the sealed key blob 400 and may determine whether the computed digest value has a predetermined relationship (e.g. equal) to the digest value 424 of the protected key blob 402. In response to determining that the computed digest value does not have the predetermined relationship, the portable token 112 may return an error message, may close the established session, may scrub the protected key blob 402 and associated data from the portable token 112, and may deactivate the portable token 112 in block 604.

In response to determining that the request is valid, the portable token 112 in block 608 may provide the monitor 302 with the sealed key blob 400. The monitor 302 and the fixed token 110 may then establish in block 610 a session for the asymmetric key of the fixed token 110 that was used to create the sealed key blob 400. In block 612, the monitor 302 may request that the fixed token 110 load the asymmetric key pair 408, 414 of the sealed key blob 400. To this end, the monitor 302 may provide the fixed token 110 with the sealed key blob 400 and an authentication code or MAC that provides proof of possessing or having knowledge of the usage authorization data 412 associated with the sealed key blob 400. In one embodiment, the monitor 302 may provide the fixed token 110 with a MAC resulting from an HMAC calculation using a shared secret based upon the usage authorization data 412 in a manner as described above in regard to block 602.

In block 614, the fixed token 110 may validate the request for loading the asymmetric key pair 408, 414 of the sealed key blob 400. In one embodiment, the fixed token 110 may compute the authentication code that the fixed token 110 expects to receive from the monitor 302. In particular, the fixed token 110 may decrypt the sealed key blob 400 using the private key 206 of the established session to obtain the asymmetric key pair 408, 414, the usage authorization data 412, the seal record 410, and the digest value 416 of the sealed key blob 400. The fixed token 110 may then compute the authentication code or MAC in the same manner as the monitor 302 using the parameters received from the request and the first usage authorization data obtained from the first sealed key blob. In response to determining that the computed authentication code or MAC does not have the predetermined relationship (e.g. equal) to the authentication code or MAC received from the monitor 302, the fixed token 110 may return an error message, may close the established session, may scrub the first sealed key blob and associated data from the fixed token 110, and may deactivate the portable token 112 in block 616. Further, the fixed token 110 in block 614 may verify that sealed key blob 400 has not been altered. In particular, the fixed token 110 may compute a digest value based upon the usage authorization data 412, the asymmetric key pair 408, 414, and the seal record 410 and may determine whether the computed digest value has a predetermined relationship (e.g. equal) to the digest value 416 of the sealed key blob 400. In response to determining that the computed digest value does not have the predetermined relationship, the fixed token 110 may return an error message, may close the established session, may scrub the sealed key blob 400 and associated data from the fixed token 110, and may deactivate the portable token 112 in block 616.

The fixed token 110 in block 618 may further verify that the environment 300 is appropriate for loading the asymmetric key 408 of the sealed key blob 400. In particular, the fixed token 110 may determine whether the metrics of the seal record 410 have a predetermined relationship (e.g. equal) to the metrics of the PCR registers 210 and may determine whether the proof value of the seal record 410 indicates that the fixed token 110 created the sealed key blob 400. In response to determining that the metrics of the seal record 410 do not have the predetermined relationship to the metrics of the PCR registers 210 or determining that the fixed token 110 did not create the sealed key blob 400, the fixed token 110 may return an error message, may close the established session, may scrub the sealed key blob 400 and associated data from the fixed token 110, and may deactivate the portable token 112 in block 616.

In response to determining that the request and environment are valid, the fixed token 110 in block 620 may provide the monitor 302 with the public key 408 of the sealed key blob 400 and a key handle to reference the asymmetric key pair 408, 414 stored in protected storage 204 of the fixed token 110. The monitor 302 may later provide the key handle to the fixed token 110 to establish a session to use the asymmetric key pair 408, 414 identified by the key handle.

The methods of FIG. 5 and FIG. 6 in general result in establishing an asymmetric key pair that may be used only if the portable token 112 is present and optionally the environment 300 is appropriate as indicated by the metrics of the PCR registers 210. The computing device 100 and/or remote agents $118_1 \ldots 118_R$ therefore may determine that the user of the portable token 112 is present based upon whether the keys 408 of the sealed key blob 400 are successfully loaded by the fixed token 110 and/or the ability to decrypt a secret that may only be decrypted by the keys 408 of the sealed key blob 400.

Further, the user may use the portable token 112 to determine that the computing device 100 satisfies the environment criteria to which the keys 408 of the sealed key blob 400 were sealed. In particular, the user may determine that computing device 100 satisfies the environment criteria based upon whether the keys 408 of the sealed key blob 400 are successfully loaded by the fixed token 110 and/or the ability to decrypt a secret that may only be decrypted by the keys 408 of the sealed key blob 400.

The computing device 100 may perform all or a subset of the methods shown in FIG. 5 and FIG. 6 in response to executing instructions of a machine readable medium such as, for example, read only memory (ROM); random access memory (RAM); magnetic disk storage media; optical storage media; flash memory devices; and/or electrical, optical, acoustical or other form of propagated signals such as, for example, carrier waves, infrared signals, digital signals, analog signals. Furthermore, while the methods of FIG. 5 and FIG. 6 are illustrated as a sequence of operations, the computing device 100 in some embodiments may perform various illustrated operations of the methods in parallel or in a different order.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
   requesting a fixed token to create a sealed key blob comprising both a first key pair and first usage authorization data, wherein knowledge of the first usage authorization data is required in order to use a private key of the first key pair, and
   requesting a portable token to create a protected key blob, where the protected key blob comprises the sealed key blob and second usage authorization data, wherein knowledge of the second usage authorization data is required in order to obtain the sealed key blob from the protected key blob.

2. The method of claim 1 comprising
   encrypting the private key of the first key pair and the first usage authorization data with the fixed token and a public key of the fixed token, and
   creating the sealed key blob with the encrypted private key and the encrypted first usage authorization data.

3. The method of claim 2 comprising
   encrypting the sealed key blob and the second usage authorization data with the portable token and a public key of the portable token, and
   creating the protected key blob with the encrypted sealed key blob and the encrypted second usage authorization data.

4. The method of claim 3 comprising
providing the portable token with a request for the sealed key blob of the protected key blob, the request providing proof of possessing the second usage authorization data,
decrypting the encrypted sealed key blob and the encrypted second usage authorization data of the protected key blob with the portable token using a private key of the portable token, and
receiving the sealed key blob from the portable token in response to the portable token determining that the proof of possessing the second usage authorization data was valid.

5. The method of claim 4 further comprising
scrubbing the protected key blob and associated data from the portable token in response to determining that the proof of possessing the second usage authorization data was invalid.

6. The method of claim 5 further comprising
deactivating the portable token in response to determining that the proof of possessing the second usage authorization data was invalid.

7. The method of claim 4 comprising
providing the fixed token with a request to load the first key pair of the sealed key blob, the request providing proof of possessing the first usage authorization data,
decrypting the encrypted private key and the encrypted first usage authorization data of the sealed key blob with the fixed token using a private key of the fixed token, and
receiving a key handle to the first key pair of the sealed key blob in response to the fixed token determining that the proof of possessing the first usage authorization data was valid.

8. The method of claim 7 further comprising
scrubbing the sealed key blob and associated data from the fixed token in response to determining that the proof of possessing the first usage authorization data was invalid.

9. The method of claim 8 further comprising
deactivating the portable token in response to determining that the proof of possessing the first usage authorization data was invalid.

10. The method of claim 1 comprising
requesting the portable token to return the sealed key blob from the protected key blob,
providing the portable token with proof of possessing the second usage authorization data, and
obtaining the sealed key blob from the portable token only if the proof of possessing the second usage authorization data was valid.

11. The method of claim 10 comprising
requesting the fixed token to load the first key pair from the sealed key blob, and
providing the fixed token with proof of possessing the first usage authorization data, and
obtaining a key handle to the first key pair stored in the fixed token only if the proof of possessing the first usage authorization data was valid.

12. The method of claim 1 comprising
directing a request to the portable token to return the sealed key blob from the protected key blob, the request comprising proof of possessing the second usage authorization data, and
obtaining the sealed key blob from the portable token only if the portable token was present and the proof of possessing the second usage authorization data was valid.

13. The method of claim 12 comprising
directing a request to the fixed token to load the first key pair from the sealed key blob, the request comprising proof of possessing the first usage authorization data, and
obtaining a key handle to the first key pair stored in the fixed token only if the proof of possessing the first usage authorization data was valid and an environment associated with the request satisfies criteria specified by the sealed key blob.

14. A computing device, comprising
a fixed token comprising a first processing unit and first protected storage, the first processing unit to load a first key pair of a sealed key blob into the first protected storage in response to determining that a first authentication code has a predetermined relationship to first usage authorization data of the sealed key blob,
a portable token comprising a second processing unit and second protected storage, the second processing unit to return the sealed key blob from a protected key blob in response to determining that a second authentication code has a predetermined relationship to second usage authorization data of the protected key blob,
a portable token interface that enables the portable token to be coupled to and removed from the computing device,
a processor to provide the portable token with a request for the sealed key blob, wherein the request that comprises the protected key blob and the second authentication code, and to provide the fixed token with a request to load the first key pair, wherein the request comprises the sealed key blob and the first authentication code.

15. The computing device of claim 14 wherein
the fixed token is to provide a first key handle to the first key pair in response to successfully loading the first key pair, and
the processor is to determine that that a user associated with the portable token is present in response to receiving the first key handle.

16. The computing device of claim 14 wherein
the fixed token is to provide a first key handle to the first key pair in response to successfully loading the first key pair, and
the processor is to determine that a user associated with the portable token is present in response to successfully decrypting a secret using the first key pair identified by the first key handle.

17. The computing device of claim 14 wherein
the first protected storage of the fixed token comprises registers for storing metrics of an environment,
the processor is to provide the fixed token with a plurality of metrics of the environment, and
the first processing is to load the first key pair into the first protected storage only if the metrics stored in the registers indicate that the environment satisfies criteria of the sealed key blob.

18. The computing device of claim 17 wherein
the fixed token is to provide a first, key handle to the first key pair in response to successfully loading the first key pair, and the processor is to determine that the environment satisfies the criteria specified by the sealed key blob in response to receiving the first key handle.

19. The computing device of claim 17 wherein
the fixed token is to provide a first key handle to the first key pair in response to successfully loading the first key pair, and
the processor is to determine that the environment satisfies the criteria specified by the sealed key blob in response to successfully decrypting a secret using the first key pair identified by the first key handle.

20. The computing device of claim 17 wherein
the first processing unit is to scrub the sealed key blob and any associated data from the fixed token in response to determining that the environment does not satisfy the criteria of the sealed key blob.

21. The computing device of claim 14 wherein
the fixed token comprises a key pair used to create the sealed key blob,
the first processing unit only loads the first key pair of the sealed key blob in response to a request received via a first session established for the key pair used to create the sealed key blob, and
the processor is to establish the first session prior to providing the fixed token with the request to load the first key pair.

22. The computing device of claim 21 wherein
the portable token comprises a key pair used to create the protected key blob,
the second processing unit is to only load the first key pair of the sealed key blob in response to a request received via a second session established for the key pair used to create the protected key blob, and
the processor is to establish the second session prior to providing the portable token with the request to for the sealed key blob.

* * * * *